US010946933B2

(12) United States Patent
Braedt

(10) Patent No.: US 10,946,933 B2
(45) Date of Patent: Mar. 16, 2021

(54) DRIVER FOR MOUNTING A MULTIPLE SPROCKET ARRANGEMENT TO A BICYCLE

(71) Applicant: SRAM Deutschland GmbH, Schweinfurt (DE)

(72) Inventor: Henrik Braedt, Hambach (DE)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 377 days.

(21) Appl. No.: 16/122,576

(22) Filed: Sep. 5, 2018

(65) Prior Publication Data

US 2018/0370597 A1 Dec. 27, 2018

Related U.S. Application Data

(63) Continuation of application No. 15/681,753, filed on Aug. 21, 2017, which is a continuation of application No. 13/549,197, filed on Jul. 13, 2012, now Pat. No. 9,771,127.

(30) Foreign Application Priority Data

Jul. 13, 2011 (DE) .......................... 102011107162.1
Apr. 3, 2012 (DE) .......................... 102012006771.2

(51) Int. Cl.
  *B62M 9/10* (2006.01)
  *F16D 1/108* (2006.01)
  *F16D 1/10* (2006.01)

(52) U.S. Cl.
  CPC ............... *B62M 9/10* (2013.01); *F16D 1/108* (2013.01); *F16D 2001/103* (2013.01); *Y10T 403/56* (2015.01)

(58) Field of Classification Search
  CPC . B62M 9/10; B62M 9/12; F16D 41/30; F16H 55/30; B60B 27/026
  USPC .......................................................... 474/160
  See application file for complete search history.

(56) References Cited

U.S. PATENT DOCUMENTS

| 3,900,088 A | 8/1975 | Ozaki |
| 4,145,095 A | 3/1979 | Segawa |
| 4,324,323 A * | 4/1982 | Campagnolo ........... F16D 41/30 |
| | | 192/64 |
| 4,472,163 A * | 9/1984 | Bottini ..................... B62M 9/10 |
| | | 192/64 |
| 4,828,537 A | 5/1989 | Jourdain et al. |
| 4,869,710 A * | 9/1989 | Iwasaki .................... B62M 9/10 |
| | | 474/160 |
| 5,194,051 A | 3/1993 | Nagano |
| 5,480,357 A | 1/1996 | Liang |

(Continued)

FOREIGN PATENT DOCUMENTS

| DE | 9408910 U1 | 7/1994 |
| DE | 19915436 A1 | 10/2000 |

(Continued)

*Primary Examiner* — Henry Y Liu

(57) ABSTRACT

A multiple sprocket arrangement is mountable to a rear axle arrangement of a bicycle. The multiple sprocket arrangement includes a sprocket assembly having a plurality of sprockets with different numbers of teeth. The sprocket assembly includes a support ring integrated with at least a largest sprocket of the plurality of sprockets. The support ring is firmly connected to the remaining sprockets and has a torque transmitting section.

16 Claims, 13 Drawing Sheets

(56) References Cited

U.S. PATENT DOCUMENTS

| | | | |
|---|---|---|---|
| 5,503,600 A * | 4/1996 | Berecz | B62M 9/10 474/160 |
| 5,704,859 A * | 1/1998 | Feng | F16D 41/30 474/78 |
| 5,954,604 A * | 9/1999 | Nakamura | B62M 9/10 474/158 |
| 6,065,580 A | 5/2000 | Friedrich | |
| 6,264,575 B1 | 7/2001 | Lim et al. | |
| 6,382,381 B1 * | 5/2002 | Okajima | B60B 1/0215 192/64 |
| 6,428,437 B1 * | 8/2002 | Schlanger | B62M 9/10 474/160 |
| 6,488,603 B2 * | 12/2002 | Lim | B62M 9/10 192/64 |
| 6,516,931 B2 | 2/2003 | Kroger | |
| 6,866,604 B2 | 3/2005 | Kamada et al. | |
| 6,923,741 B2 * | 8/2005 | Wei | B62M 9/10 474/152 |
| 7,011,592 B2 * | 3/2006 | Shahana | B62M 9/10 474/152 |
| 7,351,171 B2 * | 4/2008 | Kanehisa | B60B 27/026 474/160 |
| 7,931,553 B2 * | 4/2011 | Tokuyama | B62M 9/10 474/160 |
| 7,959,529 B2 * | 6/2011 | Braedt | B62M 9/10 474/160 |
| 8,057,338 B2 * | 11/2011 | Kamada | B62M 9/10 474/160 |
| 8,100,795 B2 * | 1/2012 | Reiter | B62M 9/10 474/160 |
| 8,197,371 B2 * | 6/2012 | D'Aluisio | B62M 9/12 474/160 |
| 8,641,151 B2 | 2/2014 | Kamada | |
| 8,663,044 B2 * | 3/2014 | Lin | B62M 9/10 474/160 |
| 8,821,330 B2 * | 9/2014 | Dal Pra' | B62M 9/10 474/160 |
| 8,911,314 B2 * | 12/2014 | Braedt | B62M 9/10 474/160 |
| 9,771,127 B2 * | 9/2017 | Braedt | B62M 9/10 474/160 |
| 2001/0039224 A1 * | 11/2001 | Lim | B62M 9/10 474/160 |
| 2002/0020984 A1 | 2/2002 | Dunkley | |
| 2003/0064844 A1 * | 4/2003 | Lin | B62M 9/10 474/160 |
| 2004/0043855 A1 * | 3/2004 | Wei | B62M 9/10 474/160 |
| 2004/0121867 A1 * | 6/2004 | Reiter | B62M 9/10 474/160 |
| 2004/0142782 A1 * | 7/2004 | Kamada | B60B 27/026 474/160 |
| 2005/0009654 A1 * | 1/2005 | Kanehisa | B60B 27/026 474/152 |
| 2005/0119080 A1 * | 6/2005 | Wei | B62M 9/10 474/160 |
| 2006/0258499 A1 * | 11/2006 | Kamada | B62M 9/12 474/160 |
| 2007/0054770 A1 * | 3/2007 | Valle | B62M 9/10 474/160 |
| 2008/0004143 A1 * | 1/2008 | Kanehisa | B62M 9/10 474/160 |
| 2008/0058144 A1 * | 3/2008 | Oseto | B62M 9/10 474/160 |
| 2008/0188336 A1 * | 8/2008 | Tokuyama | B62M 9/10 474/160 |
| 2009/0042679 A1 * | 2/2009 | Valle | B62M 9/12 474/152 |
| 2009/0042681 A1 * | 2/2009 | Dal Pra' | B62M 9/10 474/160 |
| 2009/0042682 A1 * | 2/2009 | Dal Pra' | B62M 9/10 474/160 |
| 2009/0215566 A1 * | 8/2009 | Braedt | B62M 9/10 474/160 |
| 2009/0243250 A1 | 10/2009 | Chiang | |
| 2010/0009794 A1 * | 1/2010 | Chiang | B62M 9/10 474/160 |
| 2010/0075791 A1 * | 3/2010 | Braedt | B62M 9/10 474/160 |
| 2010/0099530 A1 * | 4/2010 | Chiang | B62M 9/10 474/160 |
| 2011/0092327 A1 * | 4/2011 | Oishi | B62M 9/10 474/160 |
| 2011/0105263 A1 * | 5/2011 | Braedt | B62M 9/10 474/160 |
| 2012/0208662 A1 * | 8/2012 | Braedt | B62D 55/0963 474/160 |
| 2012/0220402 A1 * | 8/2012 | D'Aluisio | B62M 9/12 474/160 |
| 2012/0225745 A1 * | 9/2012 | Oishi | B62M 9/125 474/160 |
| 2012/0244976 A1 * | 9/2012 | Lin | B62M 9/10 474/160 |
| 2012/0244977 A1 * | 9/2012 | Liao | B62M 9/10 474/160 |
| 2012/0244978 A1 * | 9/2012 | Liao | B62M 9/10 474/160 |
| 2012/0277045 A1 * | 11/2012 | Valle | B62M 9/10 474/156 |
| 2012/0302384 A1 * | 11/2012 | Braedt | B62M 9/10 474/160 |
| 2012/0309572 A1 * | 12/2012 | Braedt | B62M 9/10 474/160 |
| 2012/0322598 A1 * | 12/2012 | Lin | B62M 9/10 474/160 |
| 2013/0017914 A1 * | 1/2013 | Braedt | F16D 1/108 474/160 |
| 2013/0225343 A1 * | 8/2013 | Spahr | B60B 27/023 474/160 |
| 2014/0179474 A1 * | 6/2014 | Florczyk | F16H 55/30 474/160 |
| 2014/0302956 A1 * | 10/2014 | Dal Pr | F16H 55/30 474/160 |
| 2015/0018151 A1 * | 1/2015 | Dal Pr | B62M 9/10 474/160 |
| 2015/0133249 A1 * | 5/2015 | Tsai | B62M 9/12 474/160 |
| 2016/0059932 A1 * | 3/2016 | Braedt | B62M 9/10 474/160 |

FOREIGN PATENT DOCUMENTS

| | | |
|---|---|---|
| EP | 0277576 A2 | 8/1988 |
| EP | 1342657 A2 | 9/2003 |
| FR | 795935 A | 3/1936 |
| GB | 2177628 A | 1/1987 |
| JP | 59165293 U | 6/1984 |
| TW | 484584 U | 4/2002 |
| TW | 200303842 A | 9/2003 |
| TW | 200415071 A | 8/2004 |
| TW | 200502134 A | 1/2005 |
| TW | 200844000 A | 11/2008 |
| TW | 200938431 A | 9/2009 |

* cited by examiner

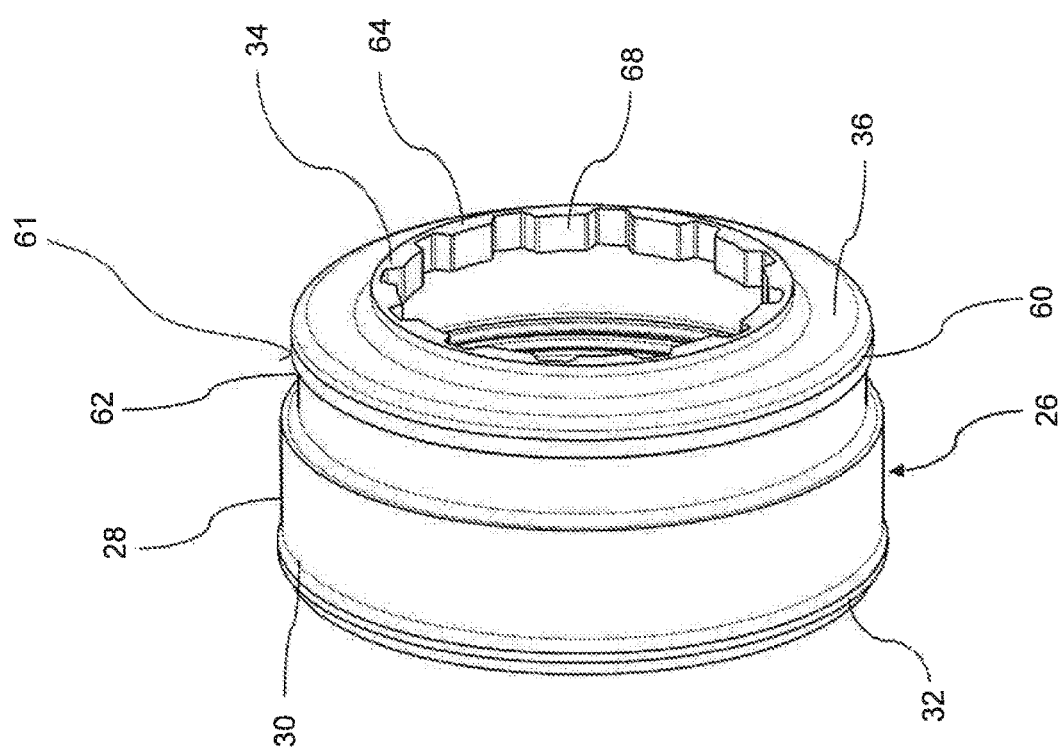
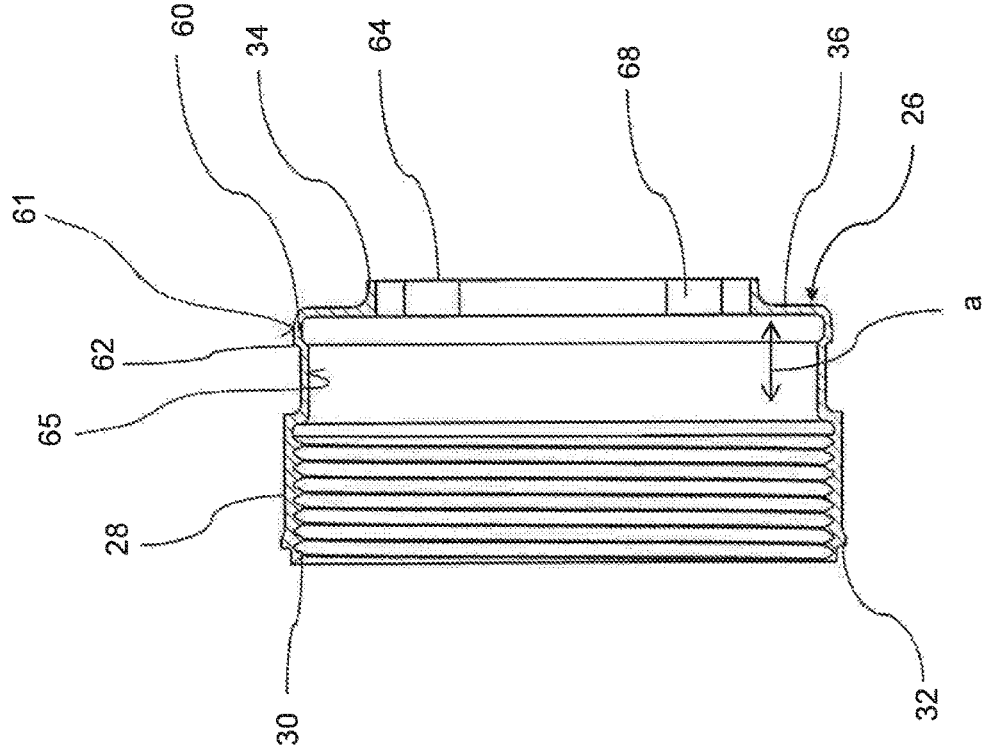

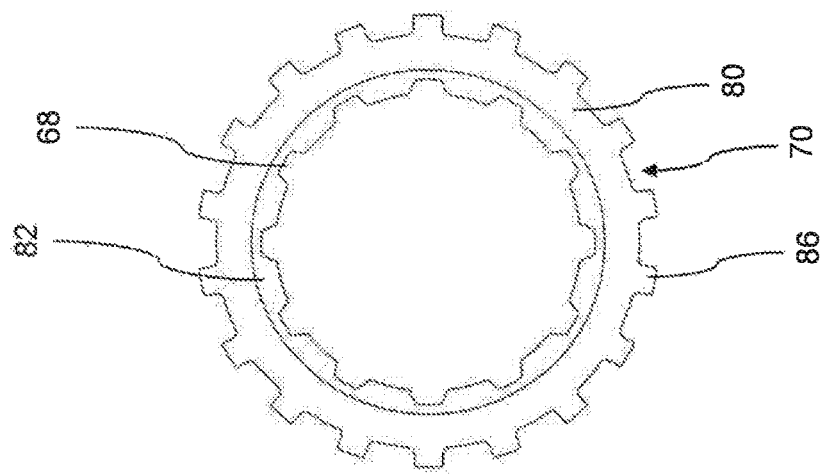
Fig. 13
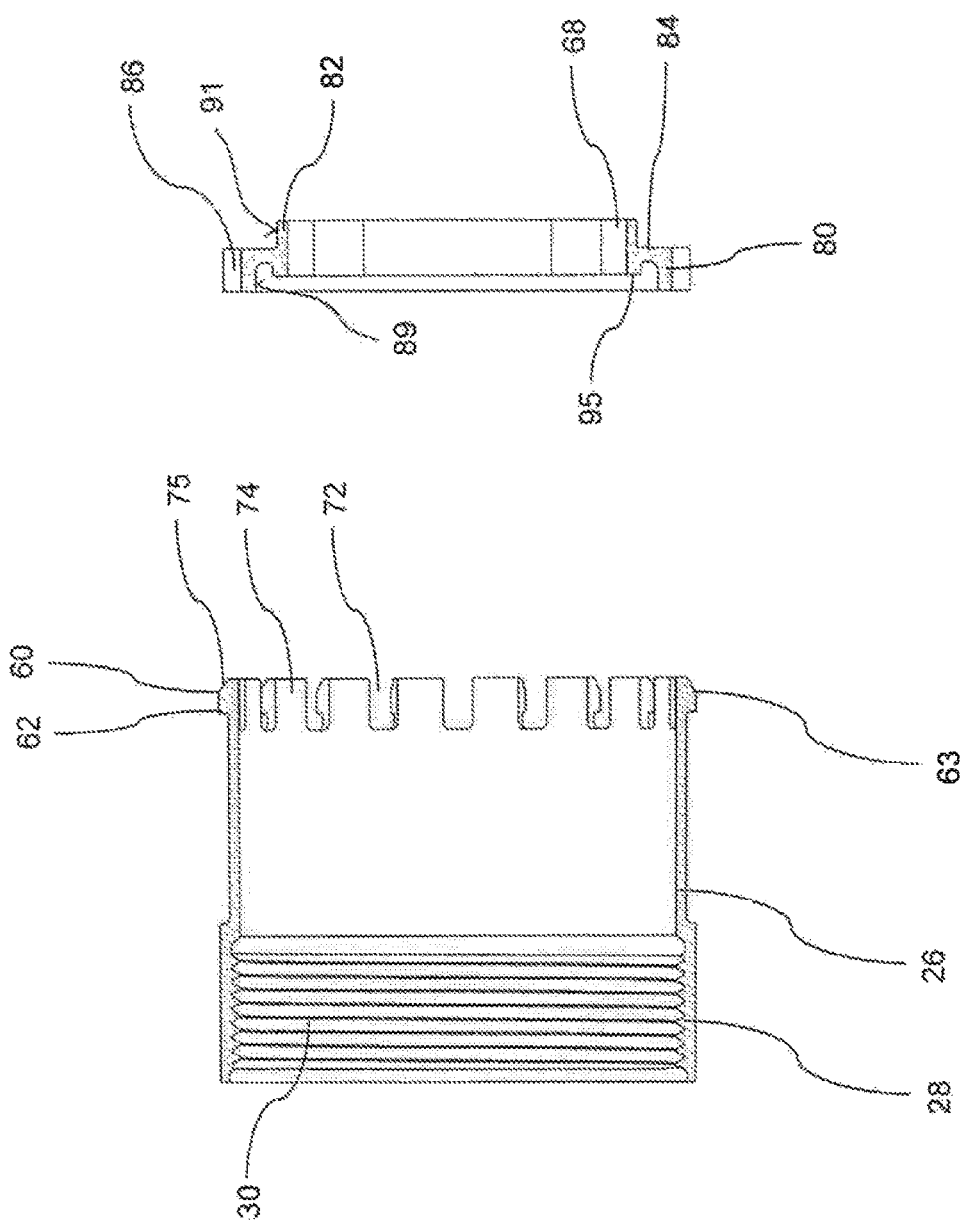
Fig. 12
Fig. 11

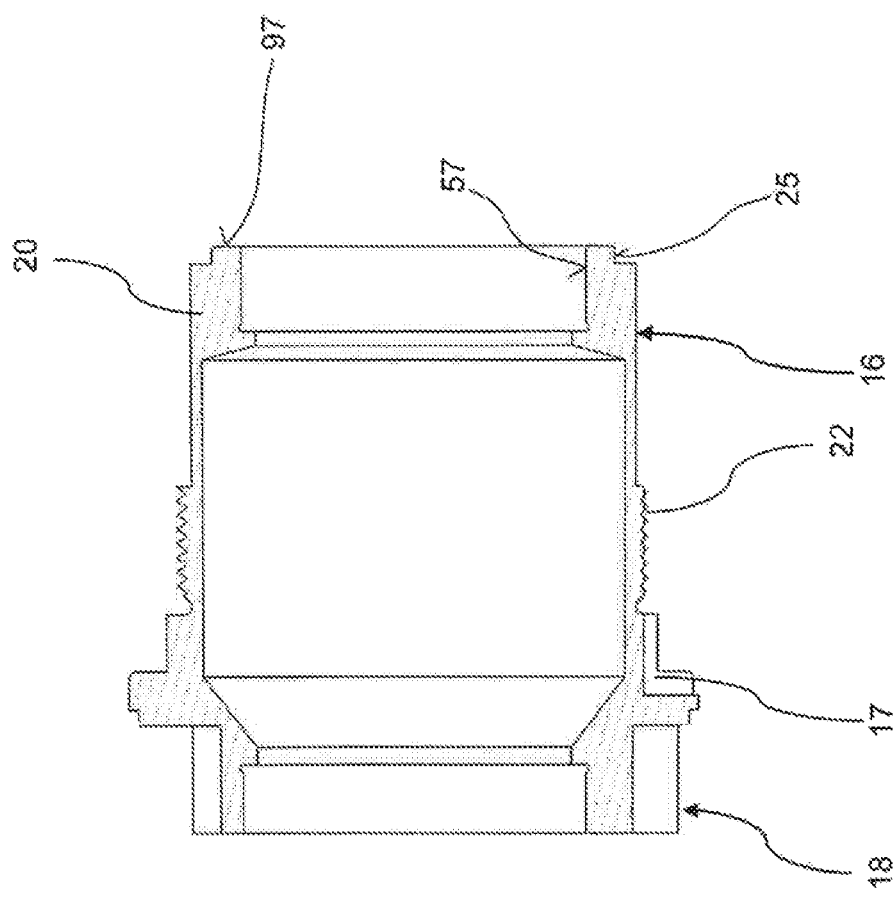

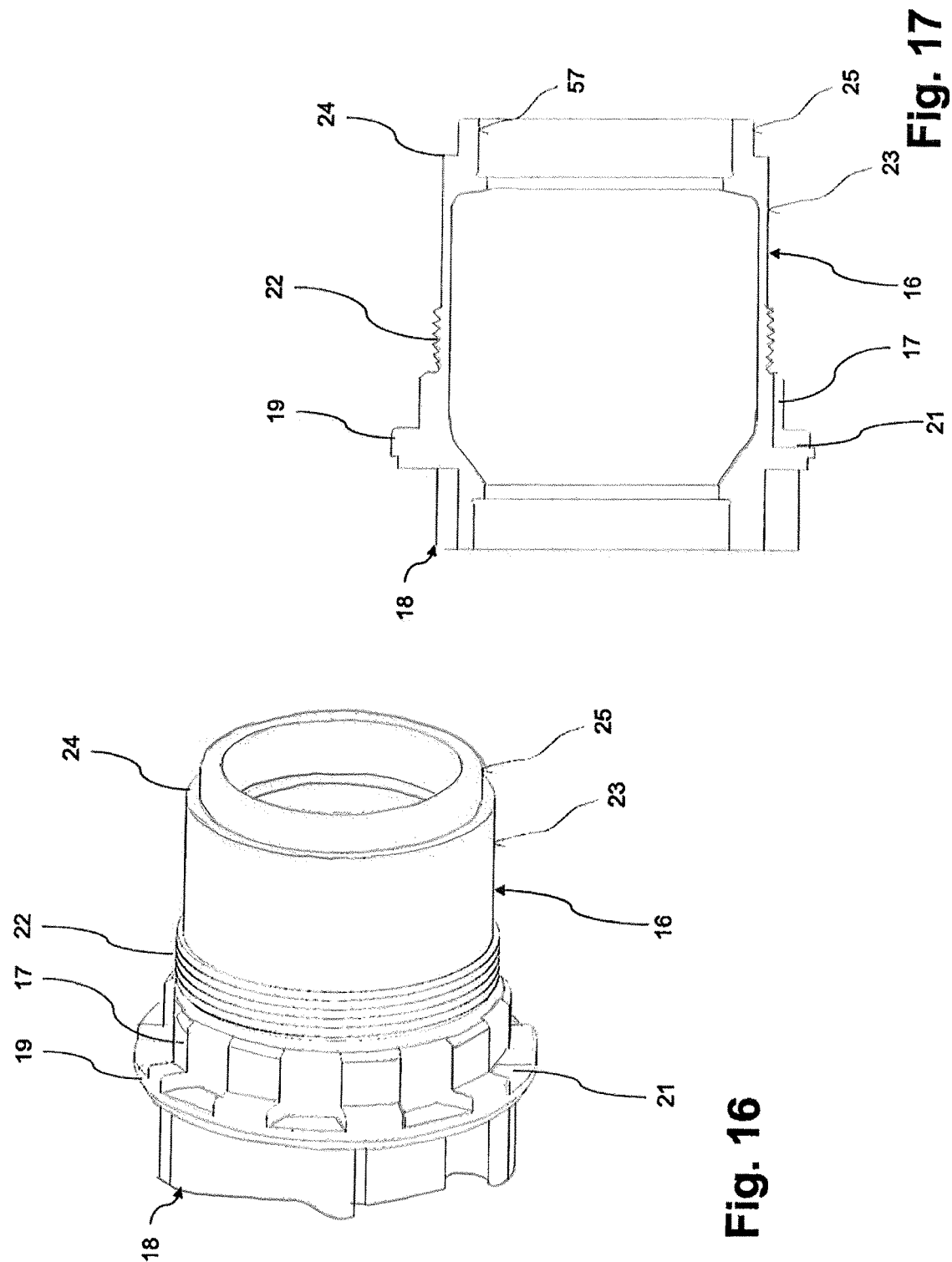

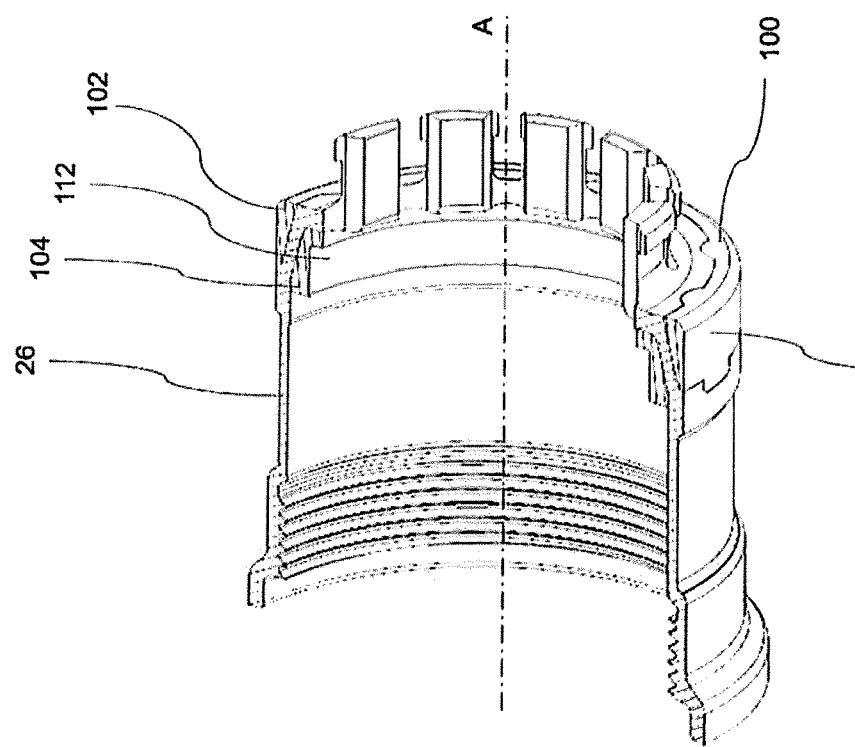
Fig. 23
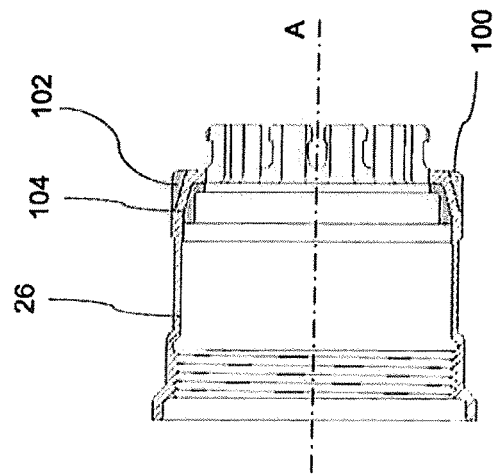
Fig. 21
Fig. 22

DRIVER FOR MOUNTING A MULTIPLE SPROCKET ARRANGEMENT TO A BICYCLE

This application claims the benefit of U.S. patent application Ser. No. 15/681,753, filed on Aug. 21, 2017, which claims the benefit of U.S. patent application Ser. No. 13/549,197, filed on Jul. 13, 2012, which claims priority to German Patent Application No. DE 102012006771.2, filed on Apr. 3, 2012 and German Patent Application No. DE 102011107162.1, filed on Jul. 13, 2011.

BACKGROUND OF THE INVENTION

The present invention relates to a driver for attaching a multiple sprocket arrangement having a plurality of sprockets with different numbers of teeth to a rear axle of a bicycle. The present invention relates in particular to a driver that is attachable to the sprocket assembly in a torque-transmitting manner, and an adapter, which may be coupled to the driver, wherein the sprocket assembly may also include sprockets having a smaller inner diameter or dedendum circle than the outer diameter of the driver, and wherein the sprocket assembly in the region of the sprockets with smaller diameter may be connected to the driver via the adapter.

Various systems are known in the prior art for the attachment of multiple sprocket arrangements to rear axles. Typically, a driver is supported in a rotatable manner on the rear axle of a bicycle via a bearing arrangement. The driver is in torque-transmitting engagement with the hub shell via a one-way clutch and permits a torque transmission in the one direction of rotation (drive direction), whereas it is decoupled from the hub shell with respect to rotation in other direction in order to provide a freewheel. Typically, an outer circumferential surface of the driver is provided with a splined configuration or a similar profile in order to allow individual sprockets, or an assembly composed of several sprockets, to be mounted thereon so as to transmit torque. A solution of this type is shown in the prior art, for example, in DE 199 15 436 A1. Comparable solutions are further shown in documents JP 59-165293, GB 2 177 628 A or EP 0 277 576 A2. Another known solution is described in EP 1 342 657 B1. It discloses a possibility of attaching sprockets with a smaller diameter to a driver. Although this system is widely used, it is increasingly reaching its limits and has some disadvantages. For example, the number of sprockets is continually increasing, particularly on high-end bicycle shifting systems now being used by both professional cyclists and recreational cyclists. Here both relatively large increments, but also especially relatively small increments are often being used so as to provide, for example, the optimal gear ratio when covering flat terrain or when riding in a group at a constant cadence. In both cases, i.e., whenever small increments with small jumps in gearing are provided, or whenever large jumps in gearing need to be available, there is an increasing need for very small sprockets, i.e. sprockets with 10 teeth or less. Such small sprockets, however, cannot be mounted on a driver of the conventional type, and thus resulting in additional parts being necessary which have a complicated structure or are difficult to install. Small-diameter sprockets specifically require relatively complex carrier profiles. Overall, particularly with the adapter solution shown in the prior art, the problem arises that a multiplicity of different parts is necessary, which are complicated to install and entail a relatively heavy weight.

Another disadvantage of this solution from the prior art is that the multi-part arrangement requires the outer bearing be further inward than the driver in the axial direction. This means that when the bicycle chain engages the smallest sprocket, there is a relatively large axial distance between the location of the chain engagement and the location of torque transmission and the bearing. This results in undesirable mechanical stresses and a less-effective power flow.

SUMMARY OF THE INVENTION

The object of the present invention is to provide a driver for a multiple sprocket arrangement of the type mentioned above with an adapter mountable to a rear axle arrangement which takes into account the problems described above and which has a simple design with reduced weight.

In contrast to the prior art, in which all sprockets generally act directly or indirectly via corresponding external splines on the driver, it was realized with the present invention that the entire driver does not need to be provided with corresponding external splines, but that sections in the external region of the driver can also be used to fix an adapter which attaches the sprocket assembly at least axially. The torque transmission between the sprocket assembly and the driver can occur spatially away from the coupling section. The adapter is preferably used solely for fixing the sprocket assembly in the axial and radial direction. This has the advantage that the sections of the sprocket assembly used for torque transmission can be designed specifically for this purpose and the sections used for axial and radial fixing via the adapter can be coordinated accordingly with the demands for axial fixing.

Furthermore, the variability for the use of different sprocket assemblies is increased by the respected adaptation of the adapter. A corresponding sprocket assembly needs only to be provided with the suitable torque transmission section and then can be axially fixed with an adapter correspondingly adapted to the sprocket assembly, wherein the adapter engages the coupling sections of the driver. This makes it possible to use even sprocket assemblies with very small sprockets, which cannot be combined with conventional drivers at all, or only with considerable technical effort.

The present invention provides a driver for mounting a multiple sprocket arrangement to a bicycle rear axle arrangement. The multiple sprocket arrangement includes a sprocket assembly having a plurality of sprockets with different numbers of teeth and an adapter. The rear axle arrangement includes a hub. The driver includes an input torque transmitting profile for transmitting torque between the sprocket assembly and the driver, a positioning section positioning the sprocket assembly in the radial direction, external thread for threadably receiving the adapter and an output torque transmitting arrangement for transmitting torque between the driver and the hub. The external thread is disposed between the input torque transmitting profile and the positioning section.

In one embodiment of the present invention, the driver includes a guide section arranged between the input torque transmitting profile and the positioning section. The guide section does not need to transmit forces, moments or any tensile stresses and therefore can be a thin wall, resulting in a light weight driver. Another advantage of the guide section is that it provides a reliable and fault-free assembly of the adapter on the driver. The guide section guides the adapter while it is being screwed on the external thread of the driver, preventing the adapter from being tilted and screwed on in a faulty manner, reducing the possibility that the external thread on the driver or the internal thread on the adapter could be damaged.

The external thread of the driver may be directly adjacent the input torque transmitting profile so that those regions in which moments and tensile stresses occur are locally concentrated and the driver can be made stronger in these loaded regions. The other regions of the driver that are not loaded can have a thinner wall.

In another embodiment of the present invention, the driver includes an axial stop for axially positioning the sprocket assembly on the rear axle arrangement. The axial stop is adjacent the input torque transmitting profile.

Further, the axial stop may be disposed adjacent the external thread and the input torque transmitting profile resulting in the forces and moments being locally concentrated.

In another embodiment of the present invention, the input torque transmitting profile extends only over a partial section of the axial length of the driver between the axial stop and a free end of the positioning section, preferably over a partial section that is smaller than a quarter, most preferably smaller than a fifth of the axial length of the driver. The input torque transmitting profile does not have to extend over the entire length or most of the length of the driver but it is sufficient that the axial length of the input torque transmitting profile correspond to the axial length of a corresponding torque transmitting profile of the sprocket assembly.

In another embodiment of the present invention, the extemai thread are directly adjacent the input torque transmitting profile. Axial forces that occur between the stop and the external thread used for engaging with the adapter, can thus be concentrated on a relatively short axial section, instead of transmitting them over a longer axial section. Furthermore, this arrangement of the external thread provides the advantage that bearing surfaces or section in which bearings have to be accommodated, do not axially overlap with the external thread. They therefore remain uninfluenced by the external thread.

In another embodiment of the present invention, the guide section of the driver includes a cylindrical outer surface that is solid or provided with weight-saving openings. In this embodiment of the driver, it is possible to design the guide section specifically for its function of guiding the adapter during its assembly in order to avoid a faulty assembly, in which, for example, the external thread on the driver or the thread on the adapter are damaged. An optimum positioning of the sprocket assembly on the driver can be achieved by using the guide section. The guide section may have a smaller maximum outer diameter than the maximum outer diameter of input torque transmitting profile or the external thread. The positioning section may have a distal end distant from the input torque transmitting profile. The positioning section has a smaller outer diameter than the outer diameter of the guide section. The smaller outer diameter of the guide section allows very small sprockets to be provided on the multiple sprocket arrangement, which is often problematic with conventional drivers. It is thereby possible for the smaller-diameter guide section to accommodate a bearing. If a larger bearing is needed to absorb greater loads, an enlarged inner diameter section may be provided on the driver at a distal end from the input torque transmitting profile.

In another embodiment of the invention, the positioning section forms part of the outer circumference of the bearing projecting axially out of the driver. In other words, it can thus be provided that the driver is embodied on its end distant from the input torque transmitting profile with an inner diameter for accommodating the bearing, which is embodied to be so large that in contrast to other embodiments a positioning section integrally embodied on the driver is completely omitted. The bearing partially accommodated in the driver and partially projecting axially therefrom forms with its outer bearing bushing a protruding section, which then is used as a positioning section. This has the advantage that the precisely produced outer surface of the outer bearing bushing of the bearing partially projecting out of the driver can be used as a positioning section embodied in a geometrically exact manner. Further, the driver has a proximal end near the input torque transmitting profile having an inner diameter section for accommodating a bearing.

In another embodiment of the invention, the sprocket assembly is preassembled as an interconnected assembly and can be connected to the driver by the adapter, wherein the adapter includes a first coupling section by which it can be installed on the driver, and includes a second coupling section by which it is coupled to the preassembled sprocket assembly. In contrast to the prior art, the sprocket assembly may be preassembled and thus is easier to handle as a whole during assembly. This also enables the adapter to be significantly simplified. The adapter can then be designed so it does not have to receive or provide the bearing support for individual sprockets or a subassembly of individual sprockets. Instead, the adapter provides only the function of primarily axial (and optionally radial) fixing of the sprocket assembly on the driver. Since the sprocket assembly is self-supporting, as it were, it does not need to be additionally supported via the adapter relative to the driver, as is the case in the prior art with systems that require the assembly and fixing of individual sprockets or sprocket groups. Naturally, within the scope of the invention advantageously drivers specifically coordinated with the adapter (as described above) are preferably used compared to conventional drivers.

The torque transmission from the sprocket assembly to the driver can also be designed in a much simpler manner than is the case with a multi-part solution with in part individual sprockets. The adapter can therefore be designed functionally precisely for the singular function of the positioning and fixing of the sprocket assembly in the axial direction and in the radial direction relative to the driver, which permits a weight optimization. As a result, the adapter or components associated with it can be provided, for example, with mating surfaces that position the sprocket assembly in a defined location relative to the driver in the axial and/or radial direction. Conicities can also be formed on the adapter that provide centering and clamping when the adapter is screwed in place. The transmission of torque between the sprocket assembly and the driver can be effected independently of the adapter at a different location on the sprocket assembly.

In particular it can be provided that the adapter includes in the region of its first coupling section and/or in the region of its second coupling section with a mating surface for radial and/or axial positioning relative to the sprocket assembly and to the driver. It is thereby possible that the mating surface is a plastic body attached to the adapter, for example, a plastic ring. The plastic ring may be molded onto the adapter. In this context it can furthermore be provided that the adapter is provided with local openings, wherein the plastic mass extends through these local openings. This embodiment ensures a reliable fixing of the plastic body to the adapter and ensures that on both sides of the adapter, i.e., on the inner circumferential surface and on the outer circumferential surface, a corresponding plastic ring with suitable mating surfaces can be embodied.

The present invention obviates the need for various different functions, such as those handled by the prior art as set forth in EP 1 342 657 B1 by the adapter or by complex intermediate sprockets mounted on the adapter, specifically, the positioning and torque transmitting accommodation of individual sprockets of small diameter. In overall terms, this results in a considerably simplified system that is clearly optimized in terms of saving weight.

In one embodiment of the present invention, the adapter is a stepped tubular sleeve having a first coupling section with a first outer diameter and a second coupling section having a second outer diameter smaller than the first outer diameter. The first outer diameter is matched to the diameter of the driver, while the second outer diameter is matched to the smaller-diameter regions of the sprocket assembly. Thus, a solid, heavy adapter can be avoided.

In this embodiment of the present invention, the first coupling section may include internal thread that engages the external thread of the driver. Thus the adapter can be screwed onto the driver which provides a reliable permanent retention during assembly. Further, the driver and the adapter respectively may have mating surfaces which with mutual abutment in the assembled state define a predetermined relative position in the axial direction and/or in the radial direction (centering) between the driver and adapter. The second coupling section may include external thread for attaching the sprocket assembly to the adapter. The attachment can be effected, for example, by an additional nut that can be screwed onto the external thread on the second coupling section of the adapter and engages the sprocket assembly to provide positioning and mounting in place.

As an alternative to a screw-on attachment between the adapter and the sprocket assembly, it is also possible to associate the adapter directly with the sprocket assembly, for example, to mount it on the assembly by a frictional-locking or positive-locking engagement. In this configuration, the second coupling section includes at least one retaining projection that engages a corresponding retaining recess on the sprocket assembly. The adapter is thus attached to the sprocket assembly by a type of latching. The interaction between the retaining projection and the retaining recess can be realized via an undercut. This embodiment has several advantages. The sprocket assembly no longer needs to be axially fixed with an additional lock nut on the smallest sprocket. It should be noted that in the prior art relatively high contact forces existed with the axially fixing of the smallest sprocket which is why the entire sprocket assembly or parts thereof have to be relatively solid and heavy. The interaction between the retaining projection and the retaining recess allows the sprocket assembly to be more effectively sized, and in particular, the assembly must only be designed with the appropriate strength in that area where the contact forces actually have an effect, i.e., in the area of the retaining formation.

In this connection, provision can be made whereby the retaining projection is disposed on an axial end of the adapter. The axial end including a plurality of slots to create latching tabs. This enables the adapter to be plugged into the sprocket assembly and latched into place such that during the latching action the latching tabs can flex elastically radially inward due to the axial slot formation and then engage behind the retaining recess in a latching action. In other words, provision may be made whereby the latching tabs are designed to snap into the retaining recess. The action of snapping in place can be assisted by providing the latching tabs with lead-in chamfers.

In order the install the adapter more easily, the adapter includes a torque-transmitting tool interface for receiving a tool. The torque-transmitting interface may be disposed directly on the adapter or on a mounting ring that can be coupled to the adapter in a torque-transmitting manner. In the first alternative, it is thus possible to provide a radial splined configuration or an end splined configuration or another type of mechanical engagement profile directly on the adapter. In both cases, a mounting tool can be engaged with the respective torque transmitting tool interface.

When a separate mounting ring is provided, the mounting ring includes radial projections that engage the axial slots between the latching tabs so as to transmit torque. The mounting ring is thus coupled with the adapter in a torque-transmitting manner.

With respect to the mounting ring, it is further possible according to the invention that this is provided with mating surfaces for the radial and/or axial positioning of the sprocket assembly relative to the driver. Unlike the above-described embodiments, the radial and/or axial positioning of the sprocket assembly can be effected either completely or partly by the mounting ring.

The sprocket assembly may include a support ring coupled to the driver to transmit torque between the sprocket assembly and the driver. This support ring specifically can be of correspondingly solid construction in order to be able to handle the demands of transmitting torque to the driver. The rest of the sprocket assembly can then be embodied in a correspondingly lighter manner. One or more end sprockets can be formed on or mounted on the support ring.

A tubular element may be provided as an axial stop between the support ring and the adapter. This tubular element functions in certain embodiments as an axial stop for the adapter or for the sprocket assembly during the coupling with the driver. This can prevent the sprocket assembly itself from being over-tightened and thus undesirably deformed.

In another embodiment of the present invention, the adapter surrounds at least one bearing accommodated in the driver. The bearing can also be placed in the adapter, wherein the adapter is then screwed into the driver by external thread, or can be screwed onto the driver by internal thread.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 6 is a cross-sectional view of an adapter of the multiple sprocket arrangement of FIG. 5;

FIG. 7 is a perspective view of the adapter of FIGS. 5 and 6;

FIG. 11 is a cross-sectional view of an adapter of the multiple sprocket arrangement of FIG. 10;

FIG. 12 is a cross-sectional view of a mounting ring of the multiple sprocket arrangement of FIG. 10;

FIG. 13 is a front view of the mounting ring of FIGS. 10 and 12;

FIG. 14 is a cross-sectional view of a driver of the multiple sprocket arrangement of FIG. 10;

FIG. 16 is a perspective view of a driver of the rear axle arrangement of FIG. 15;

FIG. 17 is a cross-sectional view of the driver of FIGS. 15 and 16;

FIGS. 21 and 22 are cross-sectional views of the adapter of FIG. 19; and

FIG. 23 is a cutaway perspective view of the adapter of FIG. 19.

DETAILED DESCRIPTION

Figure 1:
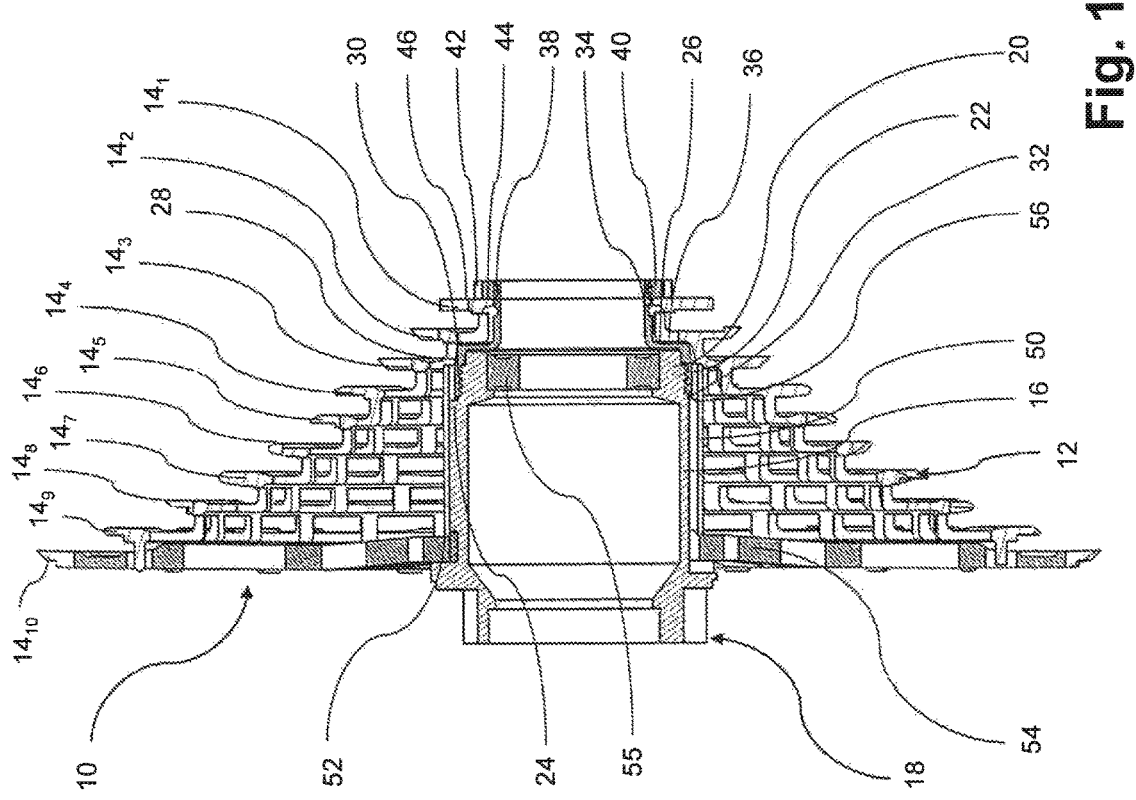
FIG. 1 is a cross-sectional view of a multiple sprocket arrangement according to one embodiment of the present invention.

FIG. 1 shows a multiple sprocket arrangement 10 mountable to a bicycle rear axle arrangement according to one embodiment of the invention.

The multiple sprocket arrangement 10 generally includes a sprocket assembly 12, a driver 16 and an adapter 26. The sprocket assembly includes a plurality of sprockets 141 through 1410 having different diameters and different numbers of teeth. The sprocket assembly may be one piece or a cohesive assembly which can be preassembled as one component during assembly. Even if the sprocket assembly 12 includes several individual parts, these are firmly connected after assembly and form a self-supporting unit.

Figure 4:
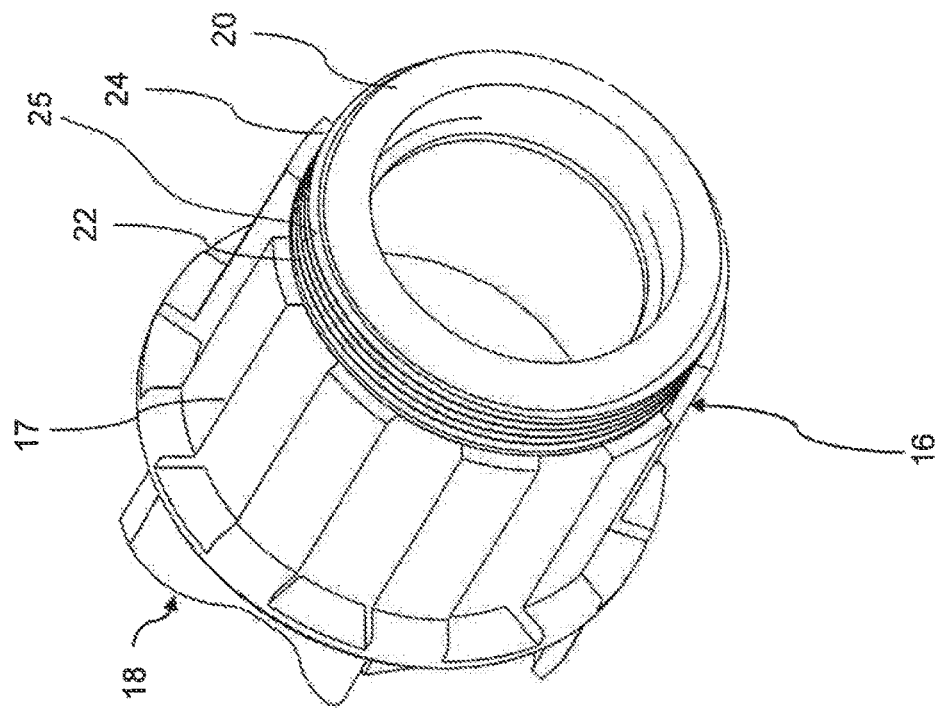
FIG. 4 is a perspective view of the driver of FIGS. 1 and 3.
Figure 3:
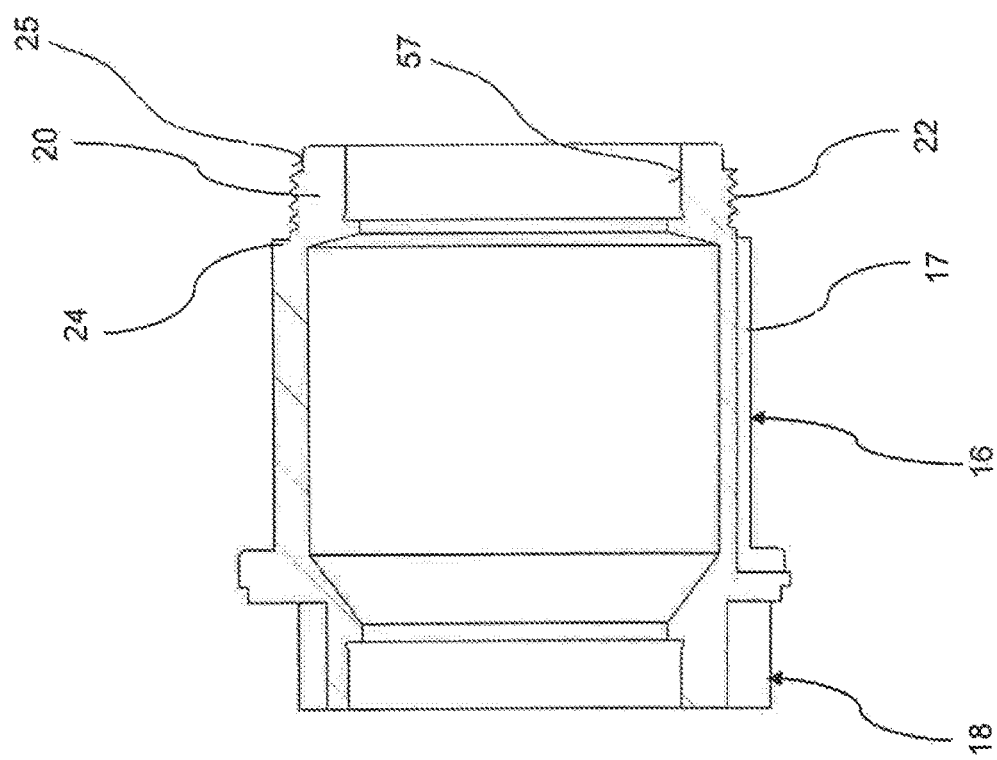
FIG. 3 is a cross-sectional view of a driver of the multiple sprocket arrangement of FIG. 1.
Figure 5:
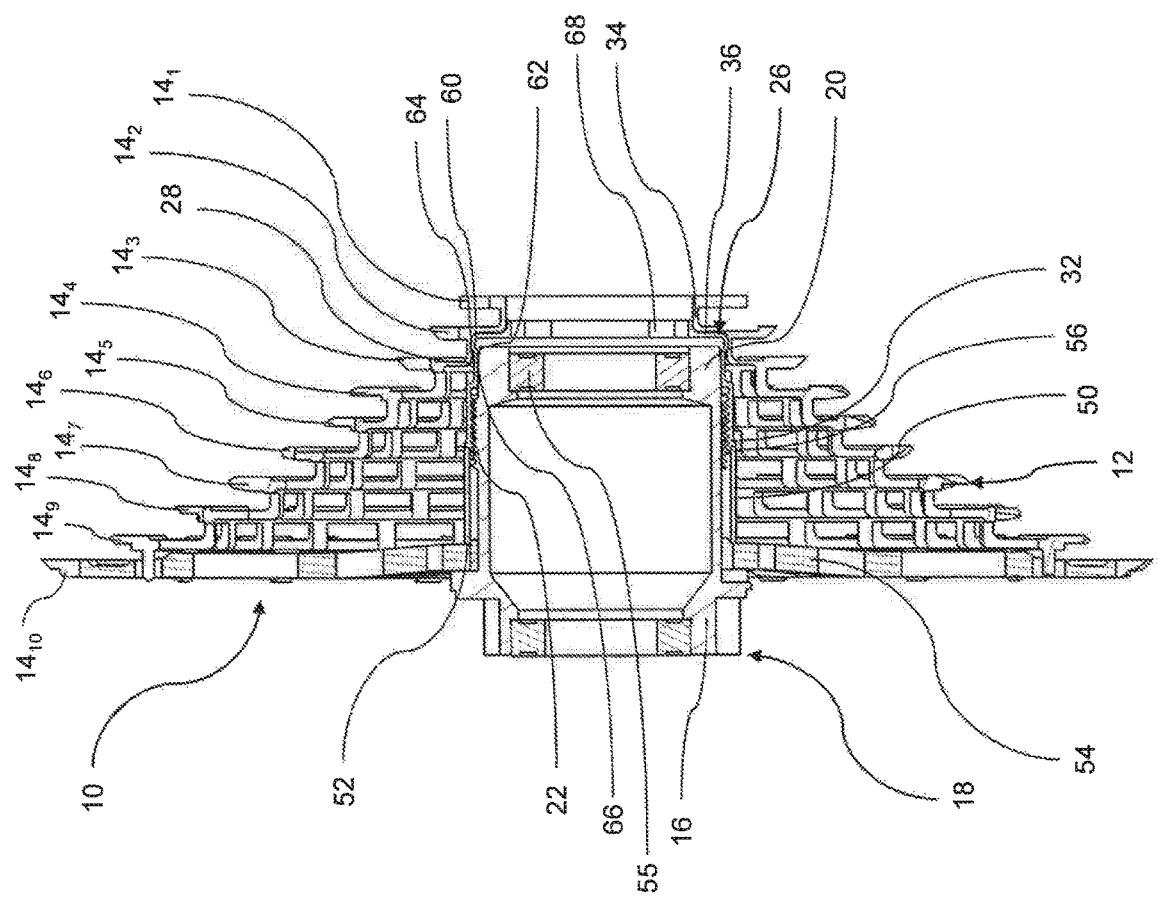
FIG. 5 is a cross-sectional view of a multiple sprocket arrangement according to another embodiment of the present invention.
Figure 9:
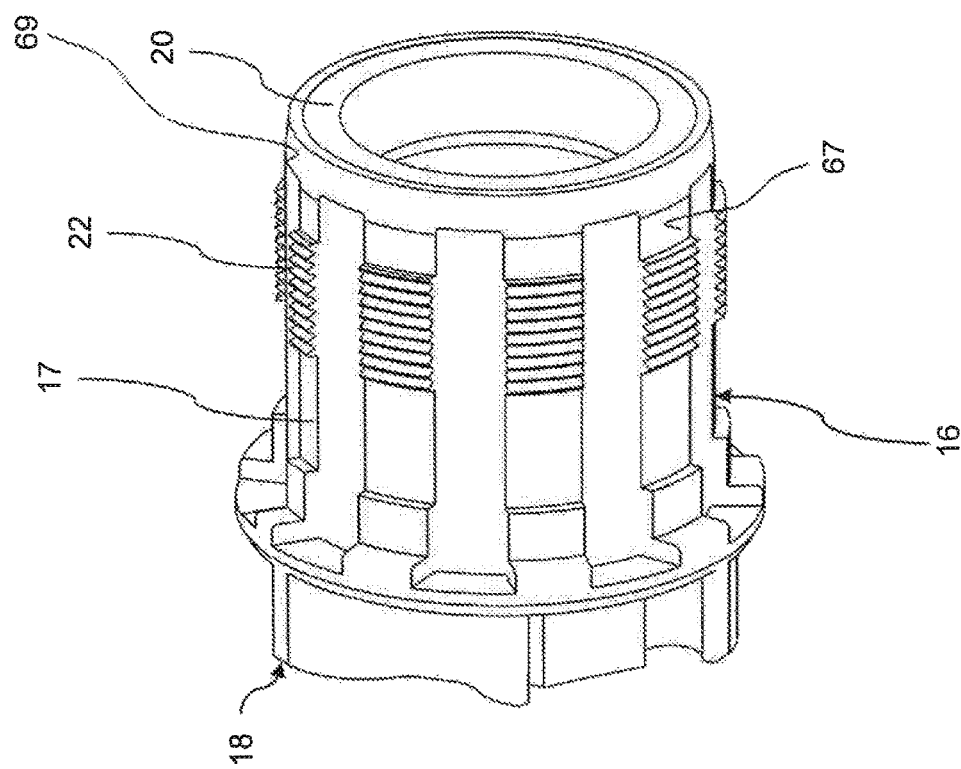
FIG. 9 is a perspective view of the driver of FIGS. 5 and 8.
Figure 8:
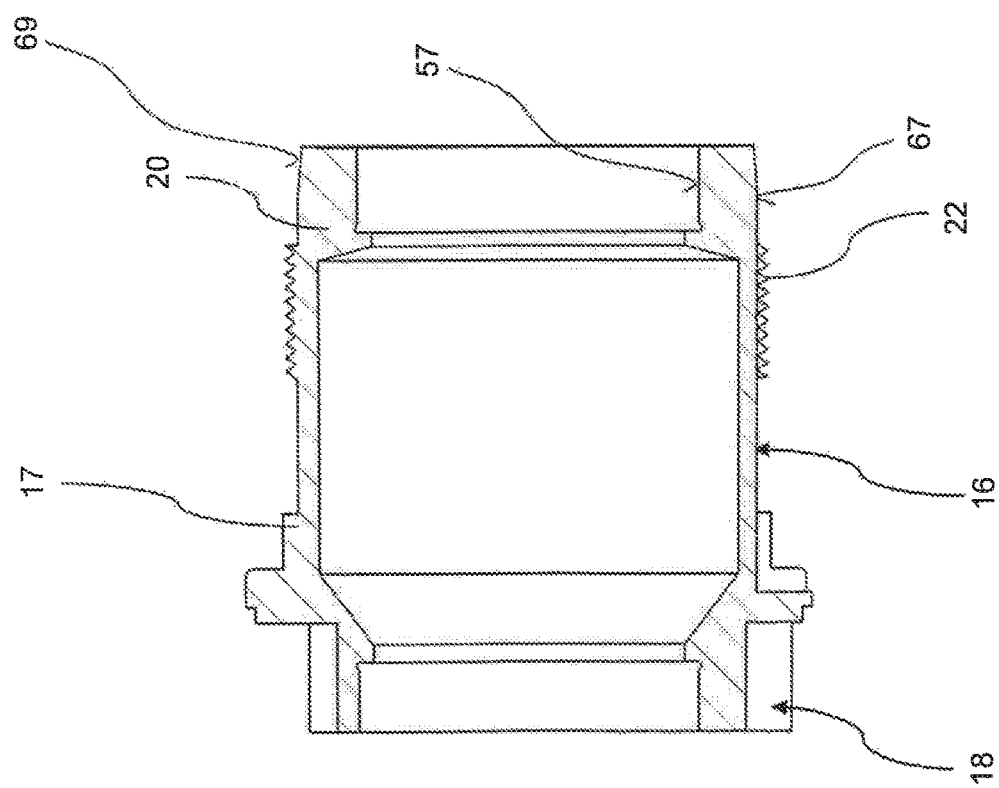
FIG. 8 is a cross-sectional view of a driver of the multiple sprocket arrangement of FIG. 5.
Figure 10:
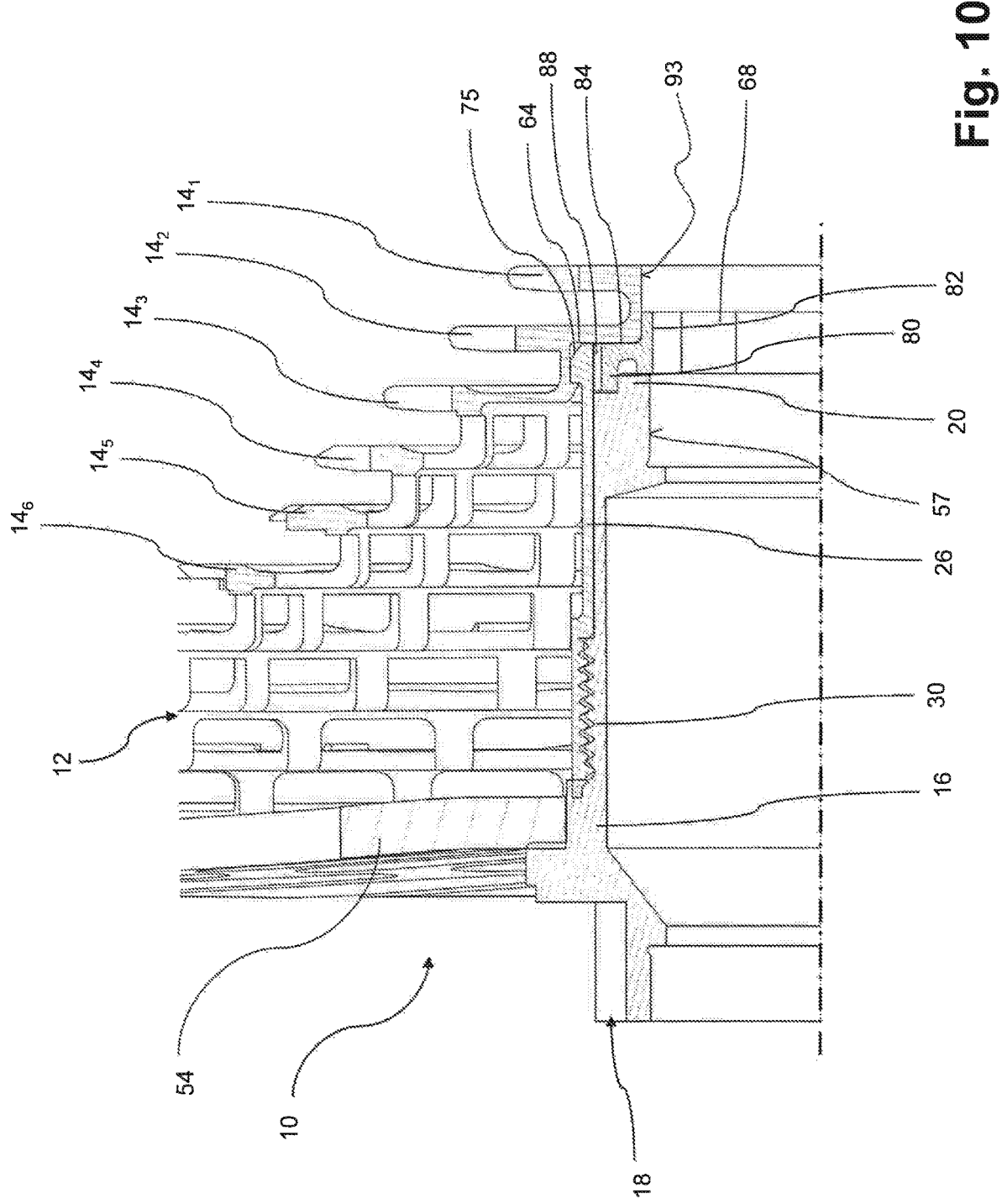
FIG. 10 is partial cross-sectional view of a multiple sprocket arrangement according to another embodiment of the present invention.

The sprocket assembly 12 is coupled to the driver 16 which is shown in detail in FIGS. 3 and 4. The driver 16 is mounted to the to a rear axle of the rear axle arrangement in a known manner. In the region 18 an arrangement may be attached for transmitting the torque from the driver 16 or the sprocket assembly 12 to a freewheel device 7 and therefrom to a hub body 8 (see FIG. 15) of the rear axle arrangement 9. The driver 16 includes an input torque transmitting profile or splines 17 for transmitting torque from the sprocket assembly 12. The driver 16 includes an axial stop or an annular radial projection 19 with an axial face 21 that is used to axially position the sprocket assembly 12.

Figure 2:
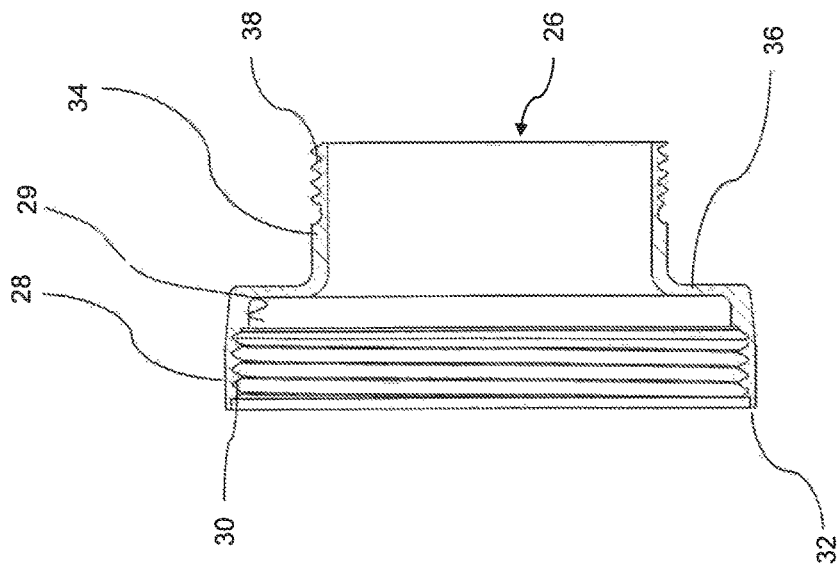
FIG. 2 is a cross-sectional view of an adapter of the multiple sprocket arrangement of FIG. 1.

On its right end in FIG. 1, the driver 16 includes a section 20 reduced in its outer diameter. The section 20 includes external thread 22 that end in a shoulder 24 and a positioning section or an outer circumferential surface 25 which forms a mating surface. The section 20 is threadably connected to the adapter 26 which is shown in detail in FIG. 2. The adapter 26 includes first coupling section 28 having a large diameter and internal thread 30. An inner circumferential surface 29 adjoins the internal thread 30. The inner circumferential surface 29 forms a mating surface that mates with the positioning section or the outer circumferential surface 25 of the driver 16 to radially position the adapter 26 relative to the driver 16.

The first coupling section 28 ends in a front face 32, which in the assembled state shown in FIG. 1 abuts the shoulder 24 and thus determines the axial position of the adapter 26 relative to the driver 16. The adapter 26 furthermore has a second coupling section 34, which has a smaller diameter than the first coupling section 28. The first and second coupling sections 28 and 34 are connected to one another via a transition section 36.

The second coupling section 34 includes external thread 38. In the assembled stated according to FIG. 1, a lock nut 40 is screwed onto the external thread 38. The lock nut 40 has on its outer circumferential surface several recesses 42, on which a tool may engage in order to exert a torque on the lock nut for bracing during the assembly. The lock nut 40 has a lateral mounting surface 44 that bears against an axial end surface 46, facing towards it, of the sprocket assembly 12. By tightening the lock nut 40, the sprocket assembly 12 can be positioned and fixed in the axial direction.

In FIG. 1, a tubular element 50 includes one end 52 supported axially on a support ring 54 of the sprocket assembly 12 and another end 56 disposed inside the sprocket assembly 12 on one of the smaller sprockets, namely on the sprocket $14_2$ The power flow applied by the tightening of the lock nut 40 in the axial direction thus extends over both the small sprockets 141 and $14_2$, the tubular element 50 on the support ring 54 and from this into the driver 16.

The sprocket assembly 12 includes the separate support ring 54, on which the largest sprocket $14_{10}$ is integrally connected to and a subassembly of the remaining sprockets 141 through $14_9$ as well as the tubular element 50 which is inserted before the attachment of the support ring 54. The support ring 54 is firmly connected to the subassembly of the remaining sprockets $14_1$ through $14_9$, for example, by molding, riveting, adhesion or the like. The support ring 54 has a torque transmission section having splines that corresponds to the input torque transmitting profile or splines 17 on the driver 16 to transfer torque between the sprocket assembly 12 and the driver 16.

FIG. 1 also shows a bearing 55 arranged in the driver 16 in a bearing recess having a mating surface 57 in a precisely fitting manner and is provided for the bearing of the driver 16 on the rear axle (not shown).

The assembly of the entire system is relatively simple. The adapter 26 shown in FIG. 1 is screwed onto the driver 16 and fixed. Then the sprocket assembly 12 is pushed onto the driver 16. Finally, the lock nut 40 is screwed on and tightened until the tubular element 50 serves as a defined stop.

Overall a system thus results that is considerably simplified compared to the prior art, which can be embodied in a substantially lighter manner than, for example, the complex multi-part system according to the closest prior art. However, this system can be combined with existing driver solutions long in use, so that sprocket assemblies with sprockets with very low numbers of teeth can also be placed on such drivers according to the prior art.

FIGS. 5-9 show another embodiment of the present invention. To avoid repetitions, the same reference numbers are used for the same type of components or components with the same action as in the previous embodiment. Only the differences from the previous embodiment are dealt with below.

Again it can be seen that external thread 22 are attached to the driver 16. A section 20 is free from thread adjoining the external thread 22. The adapter 26 includes a section 28 having internal thread 38. In contrast to the previous embodiment depicted in FIG. 1, the adapter 26 is supported with its front face 32 in the axial direction not on the driver 16 but on the tubular element 50 (see FIG. 5).

Another difference between the previous embodiment and this embodiment is how the adapter 26 is coupled to the sprocket assembly 12. The adapter 26 includes a retaining projection or section 60 having a larger diameter with an outer circumferential mating surface 61 for radial positioning and a shoulder-like mating surface 62. The section 60 engages a retaining recess or a radial recess 64 in the sprocket assembly 12, which forms an undercut. The mating surface 62 bears against a corresponding mating surface 66 to ensure that the sprocket assembly 12 in the assembled state cannot slip over the mating surface 62 in the axial direction. With the bracing of the sprocket assembly 12 with the driver, the clamping forces act at this point. This is better for the power flow than with the prior art, in which the sprocket assembly is tightened with a clamping element on the driver on the smallest sprocket, which leads to unfavorable high clamping forces on the smallest sprocket. It should be noted that the adapter 26 is not pressed in the radial recess 64, but is accommodated therein with slight play so that the adapter 26 can be rotated relative to the sprocket assembly 12.

An inner circumferential mating surface 65 arranged to increase the elasticity of the adapter at a distance a from the mating surface 61 interacts with a corresponding outer circumferential mating surface 67 of the driver 16 (see FIG. 8) for radial positioning. A slight conicity 69 is arranged outwardly of the outer circumferential mating surface 67.

An additional difference between the embodiments is that the external thread on the second coupling section 34 of the adapter 26 are eliminated because the lock nut is no longer necessary. However, the adapter 26 has on the second coupling section 34 a torque-transmitting tool interface or projections 68 extending radially inwards for receiving a tool for assembly purposes.

In this embodiment, the sprocket assembly includes the support ring 54 that is integral with the largest sprocket $14_{10}$ (end sprocket), the subassembly of the sprockets $14_1$ through $14_9$, the tubular element 50 inserted in advance and the adapter 26 inserted in advance. This arrangement is pushed onto the driver 16 and fixed by screwing the adapter 26 with its internal thread 38 onto the external thread 30 of the driver 16. With this screwing, the adapter 26 rotates relative to the subassembly of the sprockets 141 through 149.

The result is thus a design that is relatively simple, and, in particular, extremely easy to assemble. Both embodiments have the advantage that a sprocket assembly with very small sprockets and thus low numbers of teeth can be used. The embodiment according to FIGS. 5-9 has the further advantage that the use of a lock nut is no longer necessary, resulting in contact forces no longer acting on the smallest sprocket, which could impair the sprocket's elasticity when transmitting force from the chain. Moreover, due to the omission of the lock nut, practical disadvantages associated therewith can be avoided, such as the necessity of additional installation space for the lock nut.

Furthermore, an undesirable interaction of an assembly tool inserted into the outer profile of the lock nut with the teeth of the sprocket during the assembly or in operation an undesirable interaction of the outer profile of the lock nut with the chain bearing against the smallest sprocket can be avoided.

FIGS. 10-13 show another embodiment of the present invention, which is based on the embodiment of FIGS. 5-9. The differences between this embodiment and the embodiment of FIGS. 5-9 are described below.

The driver 16 according to the this embodiment is similar to the driver of the embodiment of FIGS. 5-9, except the external thread 22 are shifted further to the left in the axial direction. The fundamental differences are in the embodiment of the adapter 26 and in the attachment of an additional mounting ring 70.

The adapter 26 has internal thread 30 on its first coupling section 28. The adapter 26 is tubular and has only slight diameter differences. On its right end in FIG. 11 it has a circumferential projection 60 with a mating surface 62 and a circumferential chamfer 63. It can be seen in FIG. 11 that the adapter 26 includes on its axial end a plurality of axial slots 72, which pierce the adapter radially beyond the circumferential projection 60 and thus create individual latch tabs 74. Due to the axial slots 72, the latch tabs 74 can yield elastically radially inwards. The latch tabs 74 are provided with a circumferential chamfer 75 in order to facilitate the latching operation.

FIGS. 12 and 13 show the mounting ring 70 that includes two annular sections 80 and 82, which are connected to one another via a connection section 84. The outer annular section 80 has external splines that include radially protruding projections 86 around its outer circumference. The number and the sizing of the projections 86 and the arrangement thereof is coordinated exactly with that of the slots 72 in the adapter 26 so that the mounting ring 70 can be inserted into the adapter 26 such that the projections 86 engage into the slots 72 more or less precisely. However, a radial play 88 (see FIG. 10) is produced between the mounting ring 70 and the inner circumferential surface of the tabs 74 in order to ensure that the tabs 74 can yield elastically radially inwards. On the inner circumferential surface, the mounting ring 70 has splines 68, as has already been explained with reference to FIG. 5.

The inner circumferential surface 89 of the outer annular section 80 is a mating surface that is provided for the radial positioning of the mounting ring 70 relative to the driver. It rests in a fitted manner on the outer circumferential surface 25 on the section 20 of the driver 16.

The inner annular section 82 of the mounting ring 70 is provided with a mating surface 91, which interacts in a positioning manner with an inner circumferential surface 93 on the sprocket assembly 12 for radial positioning. Moreover, a mating surface 95 is provided on the inner annular section 82, which functions to axially position the sprocket assembly relative to the driver. This surface interacts with a corresponding end surface 97 of the driver 16.

The assembly of this embodiment is carried out in a similar manner to that according to the embodiment of FIGS. 5-9. Firstly, the adapter 26 is screwed onto the driver 16. Subsequently, the mounting ring 70 is inserted into the adapter 26 so that the projections 86 engage into the slots 72. Then the sprocket assembly 12 is mounted and finally latched with the latch tabs 74. The chamfer 63 facilitates the positioning and the mounting. The radial play between the mounting ring 70 latch tabs 74 permits a corresponding elastic deformation of the tabs 74 during the latching.

Finally, an assembly tool can be used to act in a torque-transmitting manner in the splines 68 on the inner circumferential surface of the mounting ring 70, so that the assembly ring 70 and with it the adapter 26 can be rotated for screwing the same onto the external thread 30. The sprocket assembly 12 can thus be mounted in the axial direction on the driver 16, whereby the corresponding axial forces via the interaction of the two surfaces 62 and 66 takes place between the adapter 26 and the sprocket assembly 12.

Figure 15:
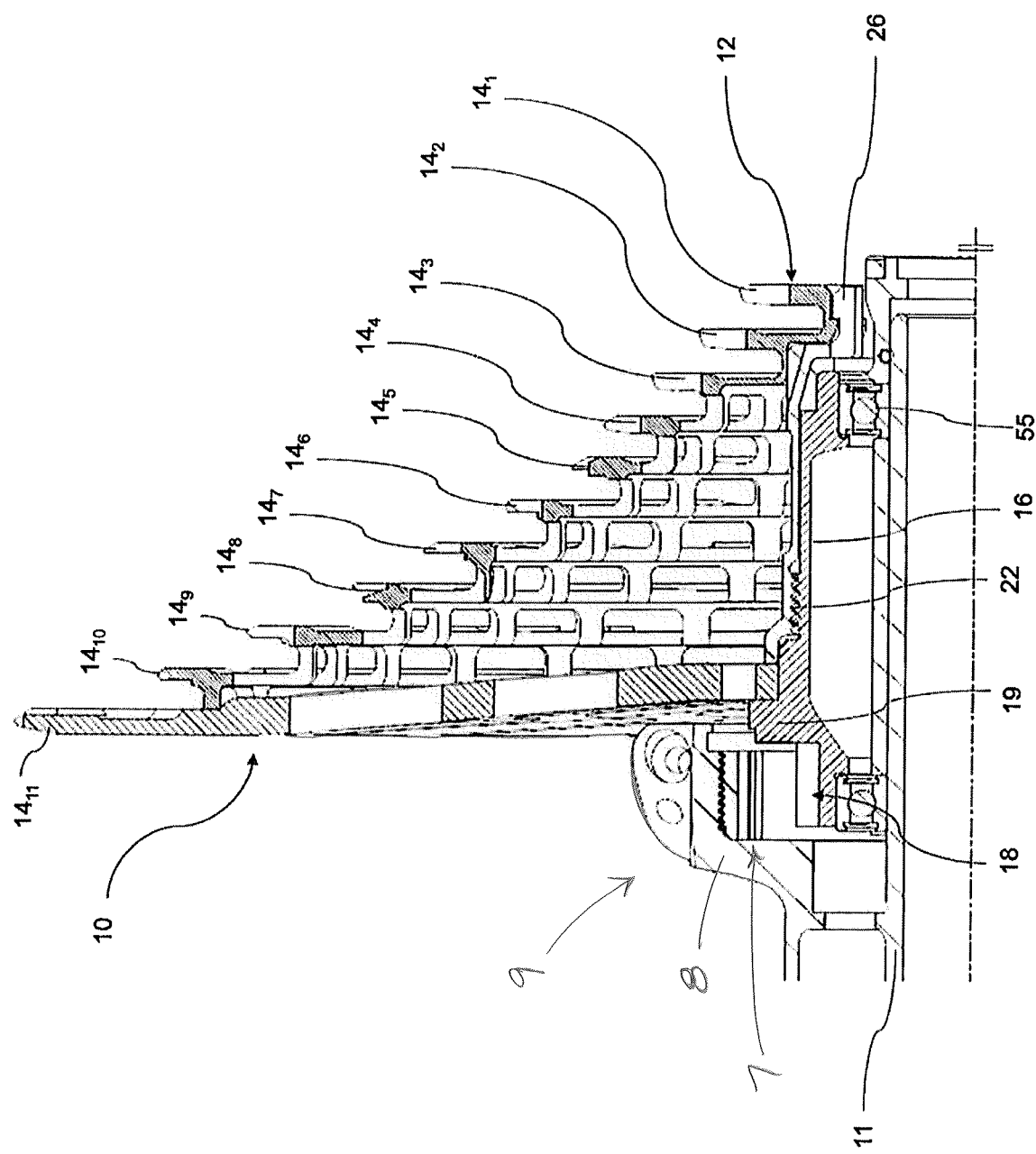
FIG. 15 is a cross-sectional view of a rear axle arrangement according to one embodiment of the present invention.

FIGS. 15-17 show a further embodiment of the invention, wherein in turn for the same type of components or components with the same action the same reference numbers are used as in the preceding description of the exemplary embodiments according to FIGS. 1-14.

The embodiment according to FIGS. 15-17 includes a driver 16 that is particularly advantageous, which is supported on an axle 11. This driver 16 includes the axial stop or annular radial projection 19 with its axial face for the axial positioning of the sprocket assembly 12. The input torque transmitting profile or external splines 17 for the torque transmission between the sprocket assembly 12 and the driver 16 extends over a relatively short longitudinal section directly adjoining the radial projection 19. The external thread 22 extends adjacent to the external splines 17. The arrangement of the driver 16 according to the embodiment according to FIGS. 15-17 is similar to the driver according to the embodiment according to FIG. 14. If, as is shown in FIG. 15, the adapter 26 is screwed to the sprocket assembly 12 and fixed by tightening the threaded assembly, tensile forces occur in the driver 16 only in the region between the axial stop 19 due to its stop function and the thread 22. The region in which these tensile forces occur is relatively small in the axial direction and embodied in a stable manner due to the splines 17.

A relatively large-area cylindrical section 23 or guide section extends in the axial direction adjoining the external thread 22, which cylindrical section interacts with a corresponding cylindrical inner circumferential surface to guide the adapter 26. This section 23 is also used as a guide surface for the adapter 26 and the sprocket assembly 12 mounted thereon during assembly. Via this guide section 23 the adapter 26 can be placed securely on the drive 16 with a certain radial play and screwed on, without a tilting of the adapter 26 relative to the driver 16 or even an oblique screwing damaging the threads 22 and 30. It should be noted that the driver as well as the adapter can be made of lightweight aluminum, wherein this material can be deformed relatively easily. The guide section 23 is advantageous for precisely this reason. The drive 16 with the shoulder 24 is embodied at the axial end of the guide section 23 and ends in the projection with reduced diameter with the outer circumferential surface 25 or positioning section, which in turn is used for the adapter 26 as mating surface for radial positioning.

The mating surface 57 to accommodate the radial bearing 55 is provided radially inside this region.

Figure 18:
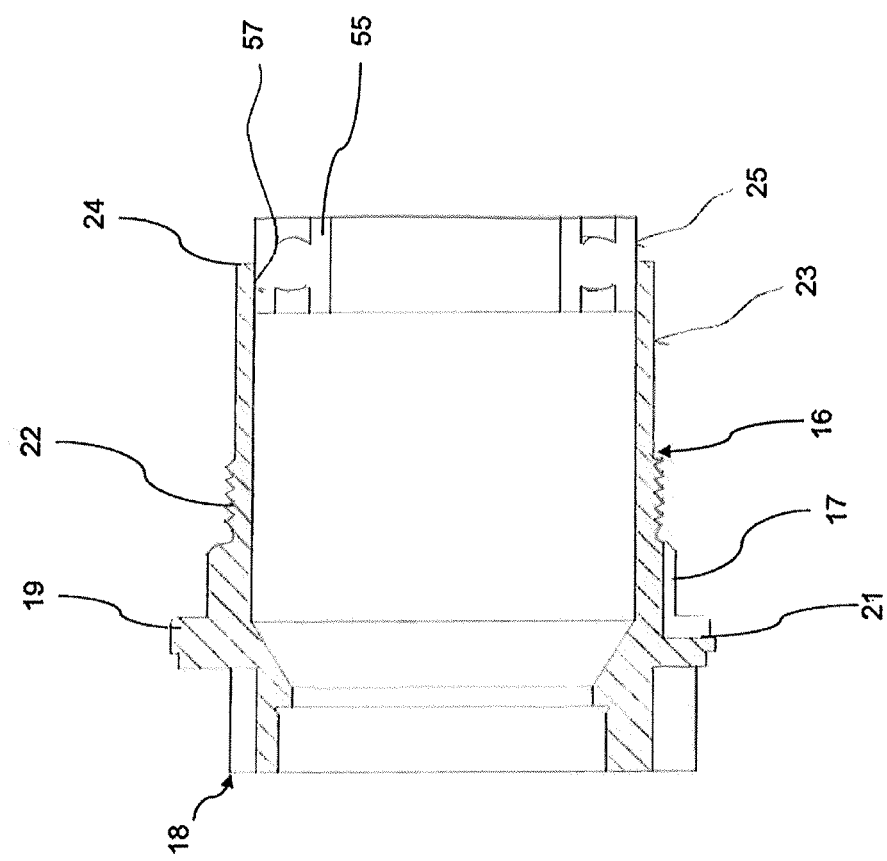
FIG. 18 is a cross-sectional view of an alternative embodiment of the driver of FIG. 17 that accommodates a larger bearing.

FIG. 18 shows an alternative embodiment to this, in which instead of a shoulder 24, a front face 24 is provided and the axial section of the driver 16 on the axial end thereof, reduced in its outer circumferential area and used to position the adapter 26, was omitted. Instead the radially inner mating surface 57 was radially enlarged in order to accommodate a bearing 55 with larger diameter, which projects out of the driver 16 by an axial section. This projecting axial section forms with its precisely embodied outer circumferential area the mating surface 25 that can be used for positioning the adapter.

FIGS. 19-23 show a further embodiment of the invention, wherein in turn the same reference numbers were used for the same type of components or components with the same action as in the preceding description of the exemplary embodiments according to FIGS. 1-18.

The embodiment according to FIGS. 19-23 corresponds essentially to the embodiment according to FIGS. 15-18 and includes an advantageously embodied adapter 26. This adapter 26 has in its right end region, which in the assembled state is arranged near to the mating surface 25, a plastic body 100. This plastic body 100 provides an annular plastic sheathing 102, 104 on the outer circumferential surface as well as on the inner circumferential surface of the adapter 26.

Figure 20:
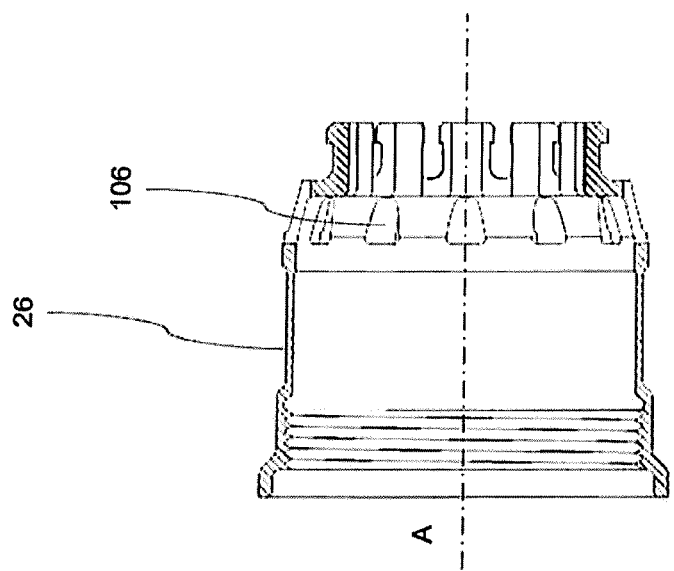
FIG. 20 is a cross-sectional view of an adapter of the multiple sprocket arrangement of FIG. 19.
Figure 19:
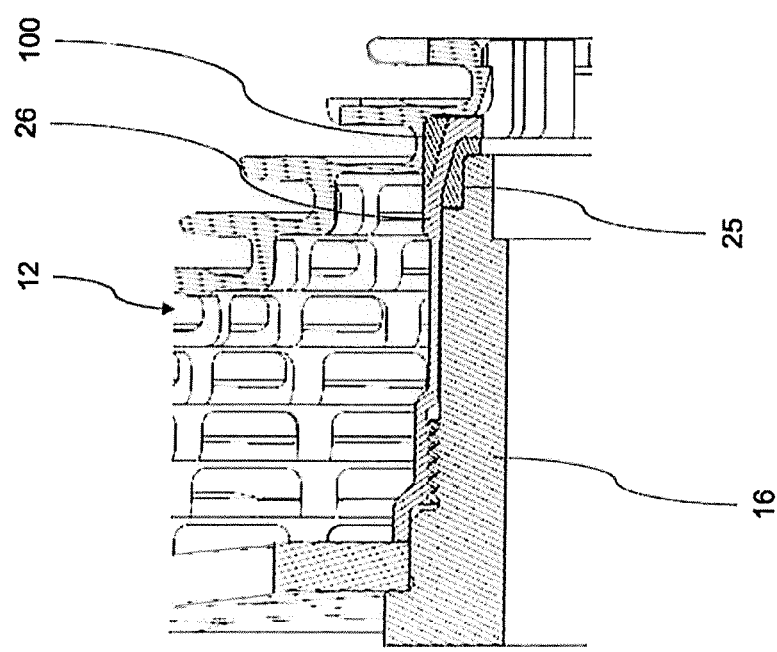
FIG. 19 is a partial cross-sectional view of a multiple sprocket arrangement according to another embodiment of the present invention.

As can be seen in FIG. 20, the adapter 26 as a blank is embodied in a slightly conical manner in this region and has radial openings 106 arranged at regular angular intervals. The two plastic rings 102, 104 are located in the region of these radial openings 106. They are integrally connected to one another by webs extending through the openings 106. The two plastic rings 102, 104 can thus be molded onto the adapter blank according to FIG. 20 and shaped integrally on the adapter 26.

The two plastic rings 102, 104 include mating surfaces 110, 112 which extend respectively parallel to the longitudinal axis A and with an area section orthogonally to the longitudinal axis A The mating surface 112 on the inner plastic ring 104 is used for the radial and axial positioning of the adapter 26 relative to the driver 16. The mating surface 110 on the outer plastic ring 102 is used to position the sprocket assembly relative to the adapter 26.

The two plastic rings 102, 104 render possible with relatively little effort a tolerance equalization in the interface to the adjacent component and the provision of suitable positioning surfaces or mating surfaces to those components that come into contact with the adapter.

In the embodiments according to FIGS. 5-23 provide the following advantages over the prior art. The contact forces on the small sprocket via a lock nut can be avoided due to the latching. The further disadvantages connected to the lock nut, such as additional installation space or an undesirable interaction with the chain or the smallest sprocket in operation or during assembly can also be avoided. The sprocket assembly can be dimensioned in a correspondingly stable manner in particular in the region of the latching, but in other regions can be embodied weaker and thus in a more weight-saving manner. Special positioning mating surfaces to the driver and to the sprocket assembly can also be provided for centering and absorbing radial loads. The driver can also be markedly improved in terms of its structure and its weight compared to the prior art. For bracing it has external thread and has a corresponding catch profile for torque transmission also in the region of the smaller sprockets, which avoids unfavorable tension conditions. The arrangement of the bearing inside the sprocket assembly is subject to far fewer restrictions. In particular the embodiments according to FIGS. 15-23 are advantageous due to the advantageous concentration of the occurring tensile forces in the region of the splines 17 embodied in a relatively solid manner. In total, all of the exemplary embodiments of the invention create many advantages over the prior art. The individual components have been clearly optimized compared to the prior art and interact with their individual features such that overall a lighter, more stable system that is easier to assembly results.

While this invention has been described by reference to several embodiments, it should be understood that numerous changes could be made within the spirit and scope of the inventive concepts described. Accordingly, it is intended that the invention not be limited to the disclosed embodiments, but that it have the full scope permitted by the language of the following claims.

I claim:

1. A multiple-sprocket arrangement for mounting on a rear wheel axle arrangement of a bicycle, comprising:
 a sprocket assembly having a plurality of sprockets of different sizes, the sprocket assembly comprising a torque transmitting section configured to interface with a driver and at least two sprockets having a smaller inner diameter than an outer diameter of the driver, and
 an adapter designed to couple the at least two sprockets of the sprocket assembly to the driver, the adapter configured to threadably attach to the driver axially inward of the at least two sprockets,
 wherein the adapter has at least one outer circumferential retaining projection configured to secure the at least two sprockets to the driver.

2. The multiple-sprocket arrangement of claim 1, wherein the outer circumferential retaining projection further comprises a shoulder-like mating surface.

3. The multiple-sprocket arrangement of claim 1, wherein the adapter includes a torque-transmitting tool interface.

4. The multiple-sprocket arrangement of claim 3, wherein the torque-transmitting tool interface is disposed directly on the adapter.

5. The multiple-sprocket arrangement of claim 1, wherein the adapter is configured to surround at least one bearing.

6. The multiple-sprocket arrangement of claim 1, wherein the adapter includes a plastic body in an end region of the adapter.

7. The multiple-sprocket arrangement of claim 6, wherein the plastic body is disposed at a mating surface of the adapter and the sprocket assembly.

8. The multiple-sprocket arrangement of claim 6, wherein the plastic body is disposed radially inward at least one sprocket of the sprocket assembly.

9. The multiple-sprocket arrangement of claim 1, wherein the torque transmitting section comprises splines.

10. The multiple-sprocket arrangement of claim 9, wherein the splines are configured to interface with splines of the driver.

11. The multiple-sprocket arrangement of claim 1, wherein the adapter is made of aluminum.

12. The multiple-sprocket arrangement of claim 1, wherein the plurality of sprockets includes a small sprocket having ten (10) or fewer teeth.

13. The multiple-sprocket arrangement of claim 12, wherein the small sprocket is one of the at least two sprockets having a smaller inner diameter than the outer diameter of the driver.

14. The multiple-sprocket arrangement of claim 1, wherein the sprocket assembly is configured to transmit all torque applied to the plurality of sprockets through the torque transmitting section.

15. The multiple-sprocket arrangement of claim 1, wherein the remaining sprockets of the plurality of sprockets number at least eight (8).

16. The multiple-sprocket arrangement of claim 1, wherein the sprocket arrangement further comprises an inner circumferential surface configured to mate with a surface of the adapter to radially position the sprocket assembly.

* * * * *